3,005,464
METERING HEAD CONTROL DEVICES
John W. Huckins, Wethersfield, Conn., assignor to Chandler-Evans Corporation, West Hartford, Conn., a corporation of Delaware
Filed Aug. 21, 1959, Ser. No. 835,235
10 Claims. (Cl. 137—117)

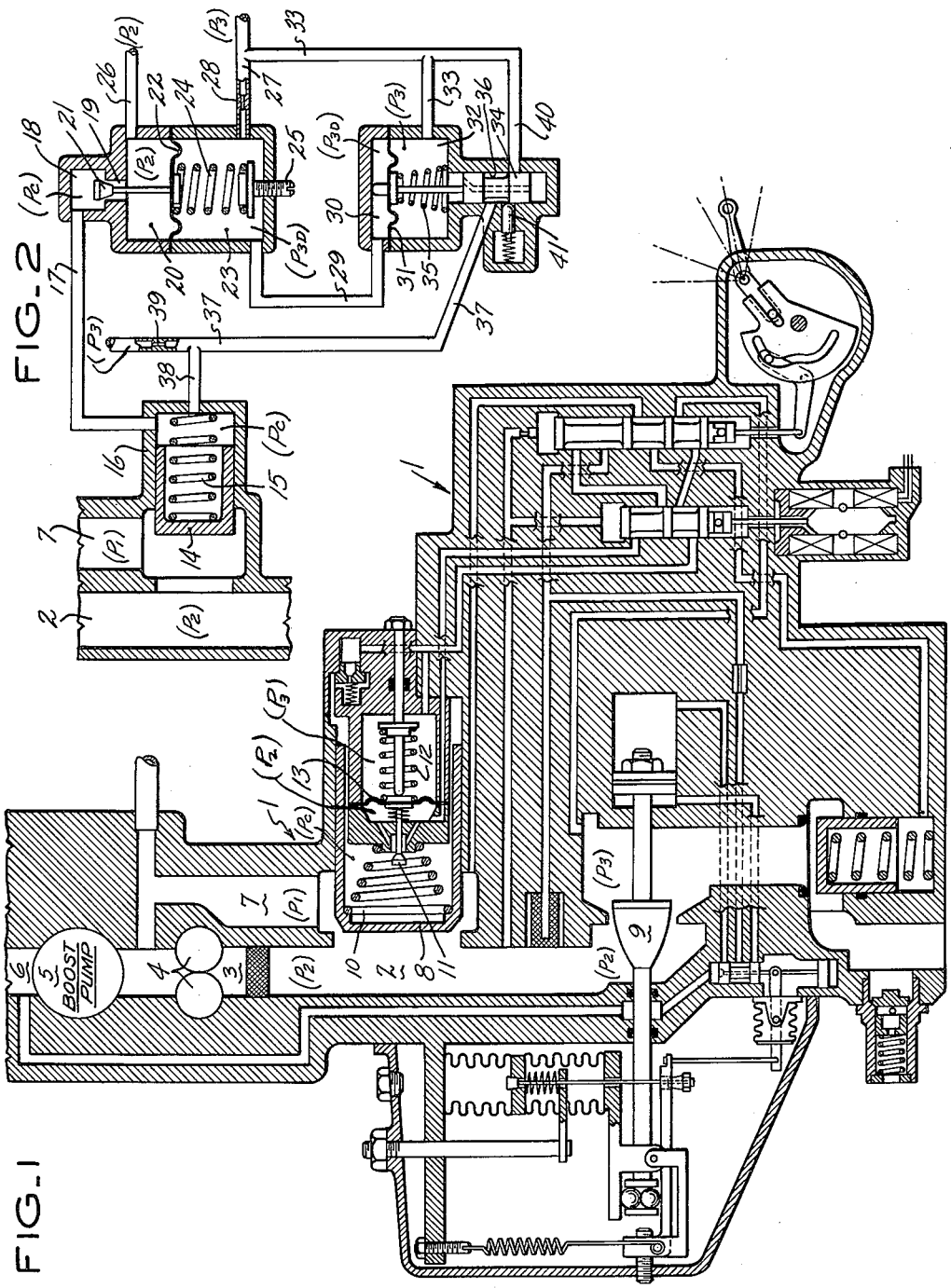

This invention pertains to afterburner fuel control apparatus for aircraft turbojet engines, and more particularly has reference to fail-safe metering head devices for afterburner fuel control apparatus of the type disclosed in copending application of Alexander M. Wright, Serial No. 688,459, filed October 7, 1957, and assigned to the same assignee as this application.

Afterburner fuel controls of the type mentioned operate on the principle of maintaining a constant metering head across a variable area fuel metering orifice. The metering head is sensed by a rubber-coated fabric diaphragm that positions a servo operated fuel by-pass valve which adjusts the fuel flow through the metering orifice, so as to maintain a constant metering head thereacross. A serious disadvantage of this arrangement is that in the event the diaphragm develops fuel leaks or ruptures, the metering head increases, with a resultant increase in metered fuel flow, which creates an unsatisfactory operating condition.

In order to avoid this condition, I have devised the fail-safe metering head device herein disclosed, which reduces the metering head and hence metered fuel flow to an acceptable, lower safe value, in the event that the sensing diaphragm develops fuel leakage, or fails by rupturing.

The fail-safe metering head device of my invention is operated automatically whenever leakage through the sensing diaphragm increases the metering head by a small, preselected amount, and said device reduces the metering head to its former proper value, without permitting an objectionable, temporary increase in metered fuel flow.

If the temporary increase in metered fuel flow is too great, the engine may be subjected to a "screech" condition, or to afterburner blow out. In order to prevent the occurrence of these conditions, my invention provides adjustable means whereby the rise in metering head required to actuate the mechanism of my fail-safe device may be suitably increased or decreased by proper adjustment of said means.

My invention also provides means whereby the fail-safe metering head control device will not be affected by pressure surges during normal afterburner operation.

With the foregoing and other objects in view which may be incident to my improvements, my invention consists in the combination and arrangements of elements hereinafter described and illustrated in the accompanying drawings, in which:

FIGURE 1 is a vertical, sectional view, partly diagrammatic, of the afterburner fuel control disclosed in the above-cited copending application, Serial No. 688,459, to which my invention is applicable.

FIGURE 2 is a schematic view of the fail-safe metering head control device of my invention, as applied to the afterburner fuel control of FIG. 1.

Referring to FIG. 1, it will be seen that the afterburner fuel control to which my invention is applied comprises a casing 1, having a fuel inlet passage 2 connected to an outlet passage 3 of a fuel gear pump 4, which receives fuel from a boost pump 5 through an inlet 6, connected to a source of fuel supply (not shown). A fuel by-pass passage 7 returns fuel, not required by the afterburners, to the main fuel system to which the afterburner control is connected. A fuel by-pass valve 8 controls the flow of fuel from inlet passage 2 to by-pass passage 7, so as to maintain a constant metering head ($P_2$—$P_3$) across a variable area, fuel metering valve 9, as described in the above-cited copending application, Serial No. 688,459.

By-pass valve 8 is biased toward closed position by a spring 10 and a control pressure $P_c$, in opposition to the fuel pressure $P_2$ in inlet 2. Control pressure $P_c$ is regulated by a servo-valve 11, which is operated by a spring 12, and a fabric, pressure-sensing diaphragm 13, subject to the differential fuel pressure ($P_2$—$P_3$) across main metering valve 9, as described in copending application, Serial No. 688,459. Thus diaphragm 13, which senses the metering head ($P_2$—$P_3$), by positioning servo valve 11, varies control pressure $P_c$, which in turn adjusts the fuel flow through valve 9 is bring the pressure drop ($P_2$—$P_3$) back to its set value.

With the foregoing arrangement, as shown in FIG. 1, it will be seen that if diaphragm 13 were to develop fuel leakage or rupture, the unbalanced forces, acting on the diaphragm, would move servo valve 11 to its wide open position, increasing control pressure $P_c$, which would move by-pass valve 8 to closed position, thereby increasing the metering head ($P_2$—$P_3$) and the metered fuel flow through valve 9. In order to prevent this undesirable situation, it was deemed advisable to incorporate some type of fail-safe device which would reduce, instead of increase, the metering head ($P_2$—$P_3$) and the metered fuel flow, in the event of leakage or rupture of diaphragm 13.

To this end the fail-safe metering head control shown in FIG. 2 was devised to replace the by-pass valve 8, and its associated operating elements, shown in FIG. 1.

The control shown in FIG. 2 comprises a by-pass valve 14, biased toward closed position by a spring 15 and control pressure ($P_c$) inside said valve, in opposition to fuel pressure $P_2$ in inlet 2. By-pass valve 14 is slidably mounted in a cylinder 16, and controls the fuel flow from inlet 2 to by-pass passage 7, in a manner similar to by-pass valve 8 of FIG. 1. Cylinder 16 is connected by a conduit 17 to a chamber 18, which communicates by a passage 19 with a chamber 20; and a valve 21, connected to a main, pressure-sensing diaphragm 22, regulates the flow of fuel from chamber 20, through passage 19 to chamber 18, and thence through conduit 17 to cylinder 16.

Diaphragm 22 separates chamber 20 from a lower chamber 23, wherein a spring 24, interposed between diaphragm 22 and an adjustable abutment 25, biases valve 21 toward open position, in opposition to pressure $P_2$ in chamber 20 in a manner similar to the action of spring 12 on diaphragm 13 of FIG. 1. Pressure $P_2$ is communicated to chamber 20 from inlet passage 2, through a connecting conduit 26. Chamber 23 is similarly connected by a conduit 27 with the fuel outlet passage downstream of metering valve 9 (FIG. 1). A restriction 28 in conduit 27 maintains the pressure $P_{3d}$ in chamber 23 at a value higher than pressure $P_3$ whenever there is any fuel flow from chamber 23 through said restriction, but since normally there is no flow through restriction 28, $P_3 = P_{3d}$.

Chamber 23 is connected by a conduit 29 with a chamber 30 in which the pressure $P_{3d}$ is the same as in chamber 23. An auxiliary, pressure-sensing diaphragm 31 separates chamber 30 from a lower chamber 32, into which the pressure $P_3$ from conduit 27 is introduced by a connecting conduit 33. Diaphragm 31 is connected to an auxiliary transfer valve 34, which is biased to its closed position (as in FIG. 2) by a spring 35 and the pressure $P_3$ in chamber 32, in opposition to pressure $P_{3d}$ in chamber 30.

Valve 34 is slidably mounted in a cylinder 36, extending from chamber 32, which is connected by conduits 37 and 38 with the right end of cylinder 16, so that when valve 34 is in closed position (as in FIG. 2), the pressure in the space between the middle reduced portion of valve 34 and cylinder 36 is the same ($P_c$) as in cylinder 16. Conduits 38 and 37 connect cylinder 16 with the fuel outlet passage downstream of metering valve 9 (FIG. 1), and a restriction 39 in conduit 37 maintains the pressure ($P_c$) in cylinder 16 and chamber 18 at a value higher than the pressure $P_3$ whenever there is any flow through restriction 39. Accordingly, during normal afterburner operation, when valve 34 is closed and there is flow through restriction 39 control pressure $P_c$ is at some level between fuel inlet pressure $P_2$ and outlet pressure $P_3$.

The interior of cylinder 36 is connected by conduits 40 and 33 to conduit 27, so that when transfer valve 34 is moved down (by auxiliary diaphragm 31) to open position, the pressure $P_c$ in cylinder 16 and chamber 18 is dumped to lower pressure $P_3$, whereupon by-pass valve 14 is moved to the right (by the greater differential pressure ($P_2$—$P_3$)) and increases the opening between fuel inlet passage 2 and by-pass passage 7. The resulting decrease in inlet pressure $P_2$ reduces the pressure differential ($P_2$—$P_3$) across metering valve 9 (FIG. 1).

The force of spring 35 on auxiliary diaphragm 31 and the shimming of transfer valve 34 are so arranged as to require a pressure drop ($P_{3d}$—$P_3$) of a small preselected value (e.g. about 2 p.s.i.) to operate valve 34. The pressure drop ($P_{3d}$—$P_3$) occurs only when there is leakage or rupture of main diaphragm 22. In this event, fuel under pressure $P_2$ passes through diaphragm 22 and increases the pressure $P_{3d}$ in chambers 23 and 30. Then, since diaphragm 22 senses a false metering head equal to the lower pressure drop ($P_2$—$P_{3d}$), the actual metering head ($P_2$—$P_3$) increases. Then the rise in metering head, when there is a leak in diaphragm 22, is equal to the rise in the differential pressure ($P_{3d}$—$P_3$), so that it requires a rise in metering head of 1 p.s.i. to produce a 1 p.s.i. rise in the pressure drop ($P_{3d}$—$P_3$).

When leakage across main diaphragm 22 occurs and the pressure differential ($P_{3d}$—$P_3$) rises to approximately 2 p.s.i., auxiliary diaphragm 31 moves transfer valve 34 to its lowest (open) position, whereupon a spring-pressed latching pin 41 locks valve 34 in said position, which corresponds to a failure in main diaphragm 22. After pin 41 locks valve 34 in failed position, the pressure $P_c$ in cylinder 16 and chamber 18 is dumped to $P_3$ pressure, and the metering head ($P_2$—$P_3$) is reduced from its normal value (e.g. 35 p.s.i.) to a much lower value (e.g. 18 p.s.i.).

As mentioned above, a 2 p.s.i. rise in metering head which is required to actuate the auxiliary transfer valve 34, produces a temporary increase in metered fuel flow of approximately 2.4 percent, which is not objectionable. However, if this increase in metered fuel flow is too great, the engine may be subjected to a "screech" condition, or burner blowout may occur. In order to avoid these conditions, the rise in metering head required to actuate the fail-safe mechanism (diaphragm 31, spring 35 and latch pin 41) is adjusted to a proper selected value, by varying the force of spring 35 on diaphragm 31, and/or by shimming transfer valve 34 for land overlap.

Because the ($P_{3d}$—$P_3$) pressure drop across the auxiliary diaphragm 31 during normal afterburner operation is zero, the auxiliary diaphragm will have very long life.

The fail-safe metering head control described above will not be affected by pressure surges during normal afterburner operation. In the event of $P_3$ pressure surge, $P_3$ pressure on the under side of auxiliary diaphragm 31 will increase faster than $P_{3d}$ pressure on the upper side because of the damping action of restriction 28. Therefore, fail-safe transfer valve 34 will not operate with surge.

While I have shown and described the preferred embodiment of my invention, it should be understood that I do not limit the invention to the particular details of construction disclosed by way of illustration, as these may be changed and modified by those skilled in the art without departing from the spirit of my invention or exceeding the scope of the appended claims.

I claim:

1. In an afterburner fuel control having a fuel metering valve and a fuel by-pass valve; a pressure drop regulating mechanism, operatively connected to said metering and by-pass valves, for regulating the pressure drop across said metering valve, comprising: a main pressure-sensing diaphragm for causing the actuation of said by-pass valve, said diaphragm being subject, when there is no extraneous fuel leakage therethrough, to a fuel pressure differential equal to the fuel pressure drop ($P_2$—$P_3$) across said metering valve, whereby said pressure drop is maintained at a preselected constant value; and first means, operatively connected to said diaphragm and said by-pass valve, for moving said by-pass valve in a direction to reduce said pressure drop, whenever extraneous fuel leakage through said diaphragm reduces the fuel pressure differential acting thereon to a preselected value below the value of said pressure drop when there is no leakage through said diaphragm.

2. A fuel pressure drop regulating mechanism according to claim 1, wherein said first means comprises second means for applying to one side of said diaphragm the higher pressure ($P_2$) of said pressure drop; third means, including a regulating valve actuated by said diaphragm for reducing said pressure ($P_2$) to a variable control pressure ($P_c$); and fourth means for applying said control pressure to actuate said by-pass valve.

3. A fuel pressure drop regulating mechanism according to claim 2, wherein said first means comprises fifth means for applying to the opposite side of said diaphragm, when there is no extraneous fuel leakage therethrough, the lower pressure ($P_3$) of said pressure drop; and an adjustable spring, biasing said regulating valve in a direction opposite to that of the pressure differential acting on said diaphragm.

4. A fuel pressure drop regulating mechanism according to claim 3, wherein said first means comprises sixth means, including a fuel flow restriction, for applying to said opposite side of said diaphragm, when there is fuel leakage therethrough, a fuel pressure ($P_{3d}$) intermediate in value between said pressure ($P_2$) and ($P_3$); and seventh means for reducing said control pressure ($P_c$) to said pressure ($P_3$), whenever the fuel pressure differential ($P_2$—$P_{3d}$), acting on said diaphragm is reduced to a preselected value.

5. A fuel pressure drop regulating mechanism according to claim 4, wherein said seventh means includes a fuel transfer valve and an auxiliary diaphragm, subject to a fuel pressure differential ($P_{3d}$—$P_3$) whenever there is fuel leakage through said main diaphragm, for actuating said transfer valve to reduce said control pressure ($P_c$) to said lower pressure ($P_3$), whenever said pressure differential ($P_{3d}$—$P_3$) rises to a preselected value.

6. A fuel pressure drop regulating mechanism according to claim 5, wherein said seventh means includes means for adjusting said preselected value of said pressure differential ($P_{3d}$—$P_3$), so that the pressure drop ($P_2$—$P_3$) across said main metering valve is limited to a preselected value.

7. A fuel pressure drop regulating mechanism according to claim 5, wherein said seventh means includes means for preventing the operation of said transfer valve by said auxiliary diaphragm, in the event of extraneous surges in said pressure ($P_3$) during normal operation.

8. A fuel pressure drop regulating mechanism according to claim 5, wherein said auxiliary diaphragm moves said transfer valve to wide-open position whenever said pressure differential ($P_{3d}-P_3$) rises to said preselected value; and said seventh means includes latching means, for locking said transfer valve in said wide-open position as long as said pressure differential ($P_{3d}-P_3$) exceeds said preselected value, and releasing said transfer valve whenever said pressure differential ($P_{3d}-P_3$) is reduced to zero value.

9. A fuel pressure drop regulating mechanism according to claim 8, wherein said seventh means includes spring means for moving said transfer value to its closed position whenever said pressure differential ($P_{3d}-P_3$) is reduced to zero value.

10. In an afterburner fuel control having a fuel metering valve and an operatively connected fuel by-pass valve, for regulating the pressure drop across said metering valve; a fail-safe fuel pressure drop, regulating mechanism, operatively connected to said metering valve and said by-pass valve, for controlling the operation of said by-pass valve, comprising: first means for applying to said by-pass valve a variable control pressure ($P_c$); second means for regulating said control pressure, including a pressure sensing diaphragm, subject to a pressure differential equal to said pressure drop, when there is no fuel leakage through said diaphragm; and third means, whereby, in the event of extraneous fuel leakage through said diaphragm, said control pressure ($P_c$) is reduced, thereby causing said by-pass valve to move in an opening direction, and hence, reduce fuel flow through said metering valve, to a preselected safe operating value.

References Cited in the file of this patent

UNITED STATES PATENTS

| | | |
|---|---|---|
| 2,498,939 | Bobier | Feb. 28, 1950 |
| 2,778,191 | Thompson | Jan. 22, 1957 |